(12) United States Patent
Chidambaran et al.

(10) Patent No.: US 10,538,445 B2
(45) Date of Patent: *Jan. 21, 2020

(54) PROCESS FOR PURIFICATION OF PRODUCED WATER

(71) Applicant: AQUATECH INTERNATIONAL, LLC, Canonsburg, PA (US)

(72) Inventors: Ravi Chidambaran, Canonsburg, PA (US); Narendra Singh Bisht, Maharastra (IN); Pavan Raina, Maharastra (IN)

(73) Assignee: Aquatech International, LLC, Canonsburg, PA (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/671,625

(22) Filed: Aug. 8, 2017

(65) Prior Publication Data

US 2017/0334758 A1    Nov. 23, 2017

Related U.S. Application Data

(63) Continuation of application No. 13/838,352, filed on Mar. 15, 2013, now Pat. No. 9,738,553.

(Continued)

(51) Int. Cl.
*B01D 1/00*    (2006.01)
*B01D 3/00*    (2006.01)
(Continued)

(52) U.S. Cl.
CPC ............ *C02F 9/00* (2013.01); *B01D 1/00* (2013.01); *B01D 3/00* (2013.01); *B01D 9/00* (2013.01);
(Continued)

(58) Field of Classification Search
CPC .... C02F 9/00; C02F 1/52; C02F 11/12; C02F 1/04; C02F 2001/5218; C02F 1/66;
(Continued)

(56) References Cited

U.S. PATENT DOCUMENTS 2,963,355 A    12/1960    Dille et al.
3,930,960 A    1/1976    Taylor
(Continued)

FOREIGN PATENT DOCUMENTS

WO    2010065031 A1    6/2010

OTHER PUBLICATIONS

Yue et al.,"Synthesis of polyamine flocculants and their potential use in treating dye wastewater", School of Environmental Science and Engineering, Shandong University, China, 2008, 7 pages.
(Continued)

*Primary Examiner* — Joseph W Drodge
(74) *Attorney, Agent, or Firm* — Buchanan Ingersoll & Rooney PC (57) ABSTRACT

We provide a process for treatment of produced water, including but not limited to water produced by a "steam flood" process for extraction of oil from oil sands, including the removal of color from the water. This removal may be accomplished through addition of color-removal polymers and flocculents. This process may also be useful for other water treatment processes including reverse osmosis and filtration.

20 Claims, 5 Drawing Sheets

Related U.S. Application Data (60) Provisional application No. 61/699,524, filed on Sep. 11, 2012, provisional application No. 61/611,806, filed on Mar. 16, 2012.

(51) Int. Cl.
| | | |
|---|---|---|
| *C02F 1/04* | (2006.01) | |
| *C02F 1/44* | (2006.01) | |
| *C02F 1/52* | (2006.01) | |
| *C02F 1/56* | (2006.01) | |
| *C02F 1/66* | (2006.01) | |
| *C02F 9/00* | (2006.01) | |
| *C02F 11/00* | (2006.01) | |
| *B01D 9/00* | (2006.01) | |
| *C02F 11/12* | (2019.01) | |

(52) U.S. Cl.
CPC ............... *C02F 1/04* (2013.01); *C02F 1/441* (2013.01); *C02F 1/52* (2013.01); *C02F 1/56* (2013.01); *C02F 1/66* (2013.01); *C02F 11/12* (2013.01); *C02F 2001/5218* (2013.01)

(58) Field of Classification Search
CPC ... C02F 1/56; C02F 1/441; C02F 1/60; B01D 9/00; B01D 3/00; B01D 1/00; B01D 61/02; B01D 61/04; B01D 2009/0086; B01D 2311/10; B01D 2311/18; B01D 2311/2669; B01D 2311/2673; B01D 2311/268; B01D 2311/2642; B01D 2311/2657; E21B 43/24; E21B 43/2405; E21B 43/2406; E21B 43/2408; E21B 43/40; E21B 21/063; E21B 21/065; E21B 21/066; E21B 21/067; E21B 21/068
USPC ....... 166/259, 267, 271, 272.3; 175/66, 206, 175/207; 210/639, 652, 669, 702, 723, 210/724, 768, 774, 804, 806, 908, 917
See application file for complete search history.

(56) References Cited

U.S. PATENT DOCUMENTS

| | | | |
|---|---|---|---|
| 4,016,075 A | 4/1977 | Wilkins | |
| 4,304,666 A | 12/1981 | Van Note | |
| 4,370,858 A | 2/1983 | Awerbuch et al. | |
| 4,428,200 A | 1/1984 | McCabe et al. | |
| 4,437,995 A | 3/1984 | Rex | |
| 4,601,731 A | 7/1986 | Michelson | |
| 4,695,664 A | 9/1987 | Whittle | |
| 4,765,913 A | 8/1988 | Featherstone | |
| 4,969,520 A * | 11/1990 | Jan .............. | C02F 1/02 166/266 |
| 5,453,206 A | 9/1995 | Browne | |
| 5,904,853 A | 5/1999 | Allen et al. | |
| 6,312,601 B1 | 11/2001 | Allen et al. | |
| 6,379,555 B1 | 4/2002 | Targosz | |
| 6,627,085 B2 | 9/2003 | Burrows et al. | |
| 6,755,251 B2 | 6/2004 | Thomas et al. | |
| 6,896,814 B2 | 5/2005 | Chidambaran et al. | |
| 7,438,129 B2 | 10/2008 | Heins | |
| 7,591,309 B2 | 9/2009 | Minnich et al. | |
| 7,591,311 B2 | 9/2009 | Minnich | |
| 7,681,643 B2 | 3/2010 | Heins | |
| 7,981,295 B2 | 7/2011 | Al-Samadi | |
| 8,062,530 B2 * | 11/2011 | Schoen .............. | C02F 1/281 210/710 |
| 8,092,656 B2 * | 1/2012 | Minnich .............. | C02F 1/048 203/10 |
| 8,469,091 B2 * | 6/2013 | Bjorklund .......... | E21B 41/0057 166/266 |
| 8,649,091 B2 | 2/2014 | Kuroi | |
| 8,776,879 B2 | 7/2014 | Bjorklund et al. | |
| 8,980,100 B2 * | 3/2015 | Chidambaran ........ | B01D 61/58 210/677 |
| 9,085,471 B2 * | 7/2015 | Mandigo ............. | C02F 1/041 |
| 9,738,553 B2 * | 8/2017 | Chidambaran ......... | B01D 9/00 |
| 10,173,914 B2 * | 1/2019 | Chidambaran ........... | C02F 9/00 |
| 2005/0000897 A1 | 1/2005 | Radomyselski et al. | |
| 2005/0279500 A1 | 12/2005 | Heins | |
| 2007/0051513 A1 * | 3/2007 | Heins ................... | E21B 43/24 166/265 |
| 2007/0095759 A1 | 5/2007 | Bridle | |
| 2007/0102359 A1 | 5/2007 | Lombardi et al. | |
| 2008/0056981 A1 | 3/2008 | Bargeman et al. | |
| 2008/0110630 A1 | 5/2008 | Minnich et al. | |
| 2008/0190607 A1 | 8/2008 | Minnich et al. | |
| 2008/0196894 A1 | 8/2008 | Minnich et al. | |
| 2009/0008334 A1 * | 1/2009 | Schoen ............... | C02F 1/281 210/666 |
| 2009/0038961 A1 * | 2/2009 | Denton ................ | C02F 9/00 205/746 |
| 2009/0056945 A1 | 3/2009 | Minnich et al. | |
| 2010/0038081 A1 * | 2/2010 | Gamache .............. | C02F 1/5245 166/267 |
| 2010/0170453 A1 * | 7/2010 | Betzer-Zilevitch ...... | B03D 1/02 122/6 R |
| 2010/0282644 A1 | 11/2010 | O'Connor et al. | |
| 2011/0147306 A1 * | 6/2011 | Polizzotti .............. | B01D 21/262 210/638 |
| 2011/0147316 A1 | 6/2011 | Polizzotti et al. | |
| 2011/0272362 A1 | 11/2011 | Sikes et al. | |
| 2012/0087737 A1 | 4/2012 | Minnich et al. | |
| 2012/0145386 A1 | 6/2012 | Bjorklund et al. | |
| 2012/0152546 A1 | 6/2012 | Polizzotti et al. | |
| 2012/0193213 A1 * | 8/2012 | James .................. | B01D 1/065 203/10 |
| 2012/0325744 A1 | 12/2012 | Polizzotti et al. | |
| 2013/0020078 A1 | 1/2013 | Vasudevan | |
| 2013/0193077 A1 | 8/2013 | Chidambaran et al. | |

OTHER PUBLICATIONS

Office Action dated Mar. 29, 2019 for Canadian Application No. 2,809,799.

* cited by examiner

PROCESS FOR PURIFICATION OF PRODUCED WATER

CROSS-REFERENCE TO RELATED APPLICATIONS

This application claims priority to U.S. Provisional Patent Application No. 61/611,806, filed on Mar. 16, 2012, and to U.S. Provisional Patent Application No. 61/699,524, filed on Sep. 11, 2012. Both of those applications are incorporated by reference herein.

BACKGROUND OF THE INVENTION

Field of the Invention

Embodiments of the invention relate to processes for purification of water.

Background of the Related Art

Vertical tube falling evaporators are conventionally used for recovery of produced water generated in steam flood processes used for heavy oil extraction. The produced water is purified by distillation and used for boilers for generating steam. The steam is injected in the underground well to recover oil, which comes out mixed with produced water. Oil is separated from water. During oil extraction the produced water picks up significant amount of dissolved solids including hardness and silica, and dissolved color and organics. This is usually purified by distillation after de-aeration and then taken for steam production again. During the distillation a goal is usually for more than 95% water to be recovered. The balance is discharged in salts caverns or injected in deep wells.

This way overall consumption of water is optimized with minimum make up losses. This process of producing oil is called the "Steam Flood" or "Steam Assisted Gravity Drainage" Process (SAGD) or "Cyclic Steam Stimulation" (CSS). The water treatment is a critical part of this operation. The water treatment process requires careful design to prevent or at least minimize scaling and solid build up, to increase up time of operation, and to improve reliability.

In existing evaporative water treatment processes for steam flood, water is pretreated to remove oil and subsequently the pH is raised to precipitate part of the hardness and keep silica in dissolved form. The part of precipitated hardness remains in the settlement tank and there is no carry-over of sludge in the evaporation system. In such a process there are no solids in the evaporation mixture and the distribution system. This water is distilled to recover almost 95-97% water through vertical falling film evaporators, and the residual brine is neutralized to reduce the pH as per environmental regulations and discharged in salt caverns or through deep well injections.

In another evaporative water treatment process, after oil removal silica is precipitated with addition of magnesium oxide and sodium hydroxide at alkaline pH, where silica is adsorbed on the surface of magnesium hydroxide. In this process resultant precipitated magnesium and silica sludge does not leave the system when water is taken for evaporation. Sludge, including color and organics as a part of water, is continuously re-circulated through the evaporator through vertical tube falling film evaporators. This risks settlement of part of the sludge in the distribution system on a continuous basis. Over a period of time this may result in formation of deposits on the surface of tubes and scaling of the tubes.

After the distillation and recovery of 97% water the brine is taken for neutralization. During the neutralization, most of the silica exists in precipitated form, which may reduce chances of gel formation but requires that all of the solids be disposed of with brine, which make the process very expensive and consumes a lot of capacity of salt cavern. Brine generated through this process is not suitable for deep well injection without extensive treatment for solids removal at this stage, where solids have sluggish settling and filtration characteristics.

Unfortunately these processes have proven unsatisfactory for a number of reasons. These include scaling of evaporator surfaces and creation of a more chemically-intensive waste product for disposal to underground wells or other areas.

BRIEF SUMMARY OF THE INVENTION

We offer an elegant solution that may simplify operations, reduce possibility of down time, increase reliability and also reduce the operating cost and disposal challenges of brine. Of course, the invention is defined by the claims, and not by success or failure in any one of the above criteria unless included in the claims.

We provide a process suitable for the purification of produced water from steam flood processes. Of course, while the process that we provide is suitable for this use, it is not necessarily limited to it, and those of skill in the art will recognize that the general teachings and specific embodiments may be put to use in other areas where color removal would be beneficial.

Processes described herein may have, but are not required to have, one or more of the following advantages over conventional processes:

1. A majority of color contributing organics, around 85-90%, are removed from the produced water in the first step of the process, which helps in the reduction of 60-70% of TOC (total organic content).
2. Around 95% of silica removal from the produced water helps in prevent severe scaling in downstream equipment.
3. Evaporator foaming is eliminated and scaling is reduced to an insignificant level, as a majority of dark, tar-like color chemicals, hardness and silica are removed prior to evaporation.
4. Easy neutralization of brine water, no jelly formation.
5. Easy sludge/solids disposal.
6. Lower chemicals cost & lower maintenance of evaporators & crystallizers.

DETAILED DESCRIPTION OF THE INVENTION

Unfortunately, existing processes fail to consider removal of color and organics, and the need to do so has not heretofore been recognized. Color in wastewater includes compounds with electron-dense functional groups that adsorb light in the visible spectrum. Color may also include organic products that are the degradation products of decaying wood or other soil organic matter. These products may have colloidal properties, as described in "Coagulation and Flocculation in Water and Wastewater Treatment," by John Bratby ($2^{nd}$ Ed. 2008), which is incorporated by reference herein and which also describes methods for measurement of color. They may include, for example, fulvic, hymatomelanic, and humic acids. These continue to pose foaming problems during evaporation. They also make it difficult to go to a zero liquid discharge ("ZLD") stage because of the concentration of color and organic contaminants and the residual ZLD solids make the ZLD product extremely tarry and difficult to handle for any subsequent processing.

In a conventional process of neutralization of brine waste, formation of a gelatinous substance takes place due to high concentration of residual silica and precipitation of silica in jelly form. This creates a substantial disadvantage for discharging waste into salt caverns or deep well injections and makes such discharge expensive. Presence of color and organics in sludge may also adversely impact uniform distribution of feed water across several tubes and may also call for frequent mechanical cleaning of the evaporative system.

We report a novel process where disadvantages of existing conventional water treatment processes may be overcome or ameliorated. Although useful for steam-assisted gravity drainage (SAGD), this process may also be suitable for other processes, including for example pretreatment of feed water for a reverse osmosis process. After removing color and/or silica the water may be subject to further treatment to remove hardness before it is taken to a reverse osmosis unit.

Embodiments include preconditioning of water. This removes a majority of color forming compounds including organics. It also removes potential scale forming contaminants with different treatment processes before the water is sent for further treatment, which may include treatment by an evaporation or membrane unit, as well as solids removal.

Figure 1:
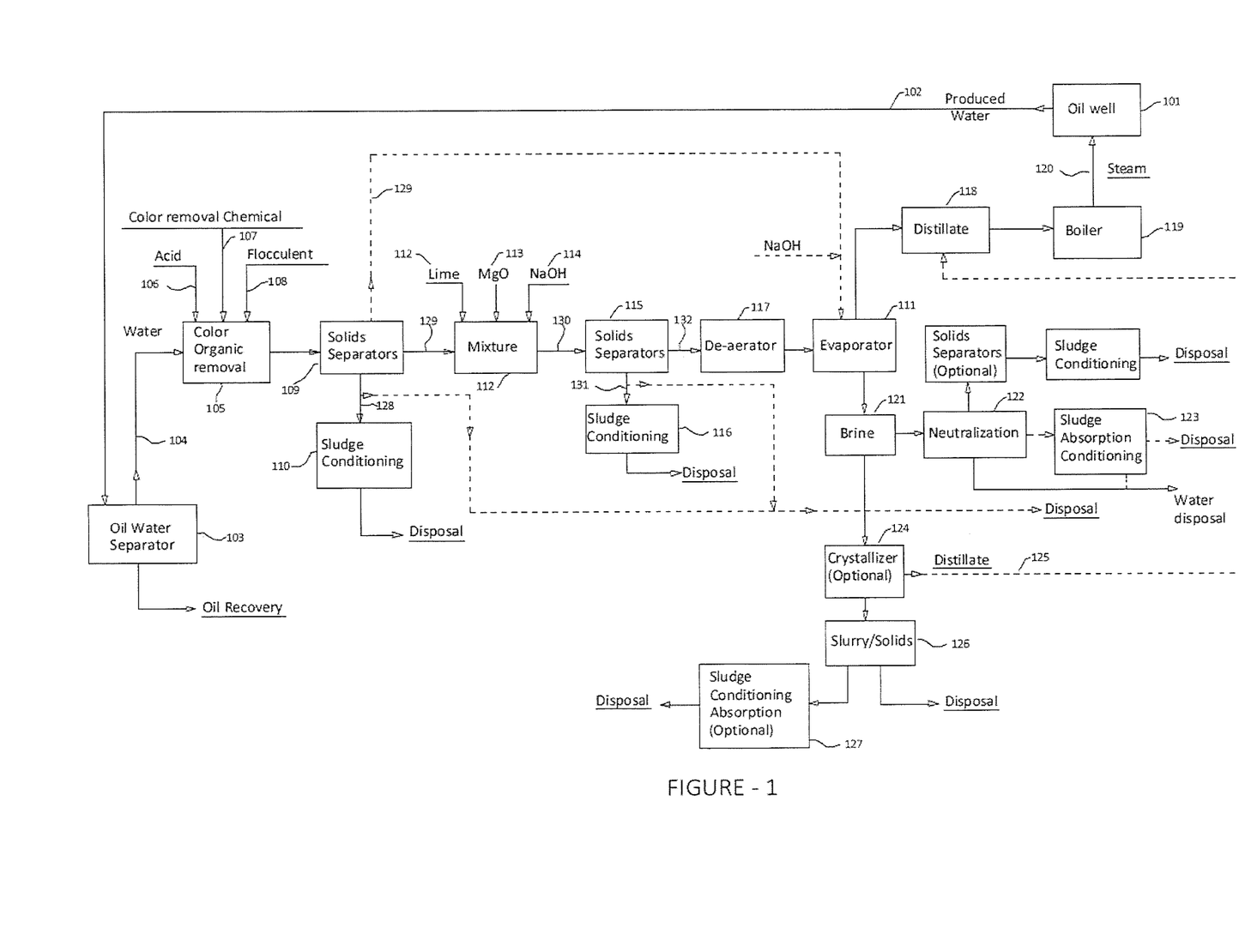
FIG. 1 is a flow diagram illustrating an overview of a process according to one embodiment of the invention for treatment of produced water.

A brief overview of an embodiment of the process may be had by recourse to FIG. 1. As shown in FIG. 1, produced water 102 is collected from an oil well 101 and then sent to an oil-water separator 103. Oil is removed and recovered. The water stream 104 then proceeds for removal of color and organics in color/organics removal tank 105. This is done by addition of an acid 106 followed by addition of chemical for color removal 107 and a flocculent 108.

The stream then proceeds to a solids separator 109. Portions of the stream are immediately disposed as solids after sludge conditioning 110. If desired, the clarified or filtered stream 129 may then be sent directly to an evaporator 111 after adjustment of pH to 9.5-10 or above.

More typically the filtered stream 129 flows from the solids separator 109 to a mixer 112, where they are mixed with lime 113, magnesium oxide 114, and sodium hydroxide 115. The stream 130, then proceeds to a second solids separator 115, where a portion of the stream 131 is removed for sludge conditioning 116 and disposal. The reminder of the stream 132 proceeds to a de-aerator 117, then to an evaporator 111. The purified distillate stream 118 from the evaporator 111 proceeds to a boiler 119, where it is used to make steam 120 for insertion into an oil well. At this stage the brine 121 can be neutralized 122 and disposed or brine with sludge is absorbed in super absorbents and disposed of. In on embodiment the super absorbent is Aquadux® 2212.

As an option, the portion of the evaporator 111 stream that is not sent for use in a boiler 119, the brine 121, may be sent to a crystallizer 124 for removal of additional distillate 125. After this optional crystallizer step the slurry 126 is sent directly for disposal or is sent for optional sludge conditioning and absorption 127, followed by disposal.

Embodiments of the invention may now be explored in more detail. In an initial step of an embodiment of the invention, pH of feed water 104 is adjusted to an acidic range of pH. Preferably the pH is about 3 to 5, or about 4 to 4.5. This is accomplished with the addition of an acid 106. Acid could be, for example, either hydrochloric acid or sulfuric acid of suitable known concentration. Acid addition is followed by addition of a color removing chemical 107 and a flocculent 108. Majority of the color is precipitated and removed by filtration.

Typically this process reduces color by around 85-90% and results in a TOC reduction of 60-70%. The color removal process also gives a silica reduction of 15-30%. A color removal process experiment's results are stated in Table 1 of Example-1.

Suitable color removing chemicals include but are not limited to high molecular weight polymer coagulants, including the polymer Wex-floc-9 (from WexTech) or similar color removal chemicals from other suppliers. In one embodiment the compound is a polyamine as reported, for example, in Yue, et al., (School of Environmental Science and Engineering, Shandong University, China), "Synthesis of Polyamine Flocculants and Their Potential Use in Treating Dye Wastewater." The dosing of color removal chemical can be modified depending on the concentration of color and organics in the water to be treated. This concentration is often around 25-500 ppm, but typically around 50-100 ppm. The flocculent used in preferred embodiments is AT 7594 or AT 7595 (WexTech). The dosing is adjusted based on a jar test but it can vary between 0.25-5.0 ppm and mostly between 0.5-1.0 ppm.

After removal of color and associated organics and filtration of the water, magnesium oxide or dolomite-like compounds containing magnesium oxide are added under constant agitation in mixer 112. By addition of magnesium oxide at this pH, performance of the process improves over a conventional process such that silica reduction improves to less than 10 ppm in the filtrate. After this, pH is increased with predetermined quantities of lime and sodium hydroxide to adjust the pH to about 10-11.5, preferably about 11. Due to prior removal of color and silica the consumption of caustic soda at this step is reduced significantly from the amount necessary in the prior art. The amount of caustic soda may be reduced by at least 25-30% as compared to the conventional process.

The pH adjustment is followed by addition of a coagulant and polyelectrolyte. This results in formation of precipitate in the form of heavy flocks with very good settling properties. The coagulant used at this stage was AT 7260 (WexTech) or equivalent or similar chemicals supplied by other suppliers and dosing rate is adjusted based on a jar test. This dosing rate can vary between 1-5 ppm but normally between 2-3 ppm.

After providing some settling time in solid separator 115, the supernatant water 132 can be removed through decanting, centrifuging or any other filtration process. This sludge has very good settling properties and usually settles easily within 5-15 minutes. This sludge can be dewatered and sent for disposal after further sludge conditioning 116 and compaction as required based on local regulations. In this process most of the silica and calcium and magnesium hardness are removed, and water is pre-conditioned to go to the evaporation process without solids. The residual silica in water is reduced to around 5-10 ppm from 240 ppm, and the total hardness is also reduced to about 20 ppm.

The water after color removal process reduces silica in the subsequent processing, reduces foaming during evaporation, accelerates the silica precipitation during silica removal, and provides easy to handle brine after the brine concentrator and crystallizer treatments. This is highly unlike the highly viscous and tarry liquid that is typically produced if there is no color removal process to remove organics.

The supernatant liquid 132 is then taken for evaporation in evaporator 111. In one embodiment evaporation is conducted in a vertical falling film evaporator. In a preferred embodiment 95-97% water 118 is distilled out and recovered. During distillation the water remains clean with very little precipitates, and there is no or effectively no build up or settlement of solids on the distribution plates and no or effectively no deposition of solids on tubes. Typically there is no scaling of any kind because the majority of the total hardness is removed along with silica as a part of precipitated solids.

The precipitated solids in brine are separated after settling and taken for disposal after dewatering with the sludge, which was separated along with silica and magnesium precipitates in the first step.

The water 129 after the color/silica reduction step can be directly taken for evaporation without filtration of solids, if the solids concentration is not high after silica reduction and precipitation because of additional silica reduction that has happened along with color removal process. This is normally done if the silica concentration in water is about 100 to 150 ppm though that is not a requirement for this process. In that case the re-circulating water during evaporation may need filtration to maintain solids content during evaporation. In this case the color removal process will make the neutralization and separation of the salts easier during brine neutralization.

The brine 121 is taken for neutralization. In the neutralization process there is no jelly formation. There is also significant reduction in chemical consumption because most of the acid-consuming ions do not exist in the brine. The brine 122 at this stage is ready for disposal after separating any solids during neutralization. The brine can also be disposed of without removal of solids after neutralization 122 as required by local regulations. Brine 121 can also be used for mixing with solids after color removal step and/or silica removal step if the preference is not to send any solids for disposal in land fill due to local preference or constraints.

Alternatively the brine 121 can be further concentrated in crystallizer 124 by recovering 75-80% of the balance water after evaporation. The distillate 125 may be recycled for beneficial use. The slurry 126 left in the crystallizer is either sent for disposal after dewatering 127 or brine neutralization 122 or alternatively converted into solids with super absorbents 123 and sent for disposal. The resultant solid can also be incinerated if required. The color removal step increases water absorption capacity of super absorbents and makes such absorption faster. For analysis of color, especially for highly concentrated solutions after evaporation, a dilution method was used and the readings were adjusted based on factors of dilution.

Embodiments of the invention may include one or more deaeration steps. For example, deaeration may be used after color removal and solid separation and before pH is increased. It may also be used after a second-stage removal of silica. Typically deaeration occurs after sludge removal.

The applicants stress that although the utility of color removal in the steam flood process can not be underestimated, the process reported herein may be equally useful when preceding a reverse osmosis plant, with or without silica removal. It may also be useful without silica removal, as a pretreatment followed by a filtration process, like ultrafiltration and softening, to remove any residual hardness.

Example 1

Figure 2:
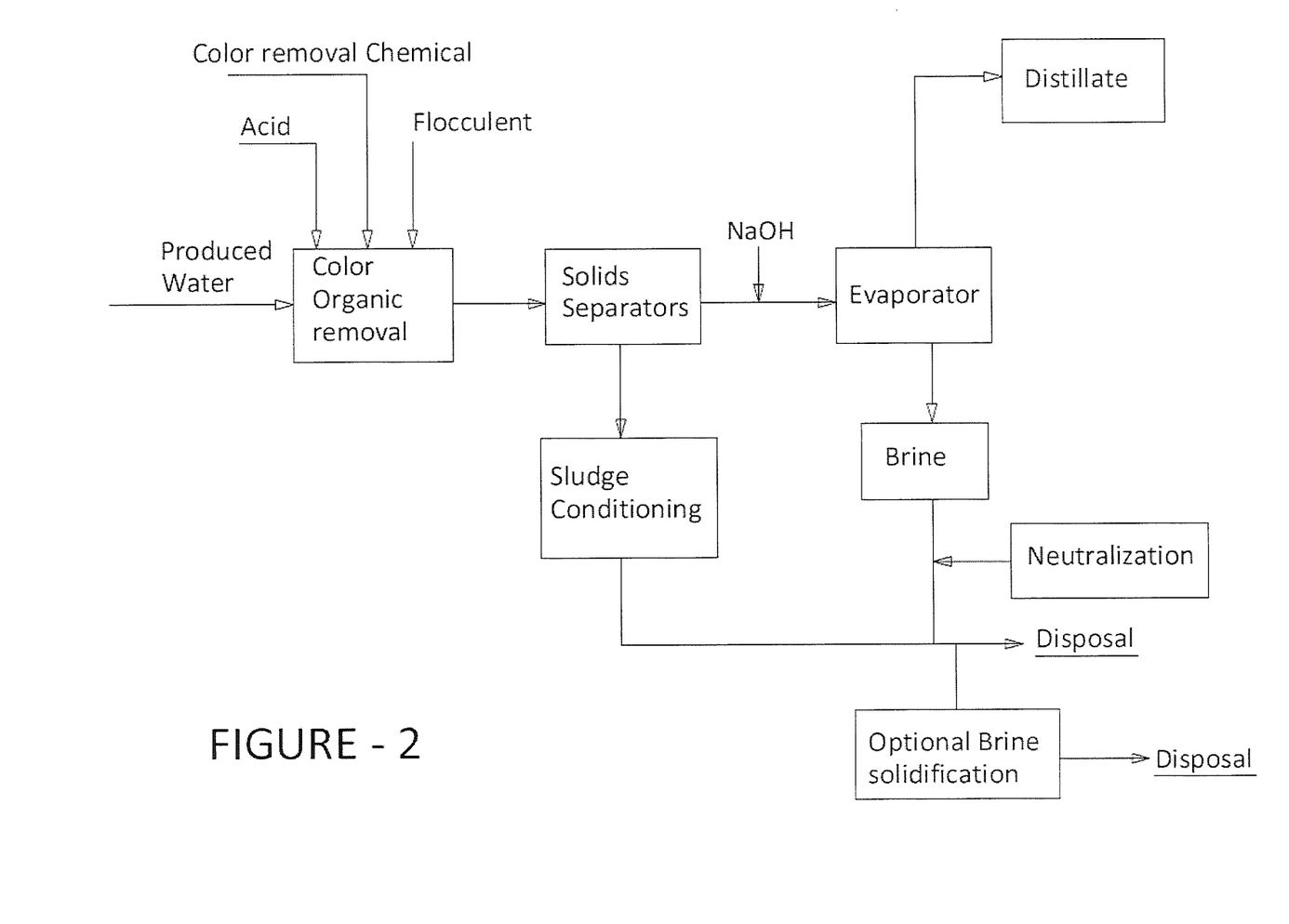
FIG. 2 is a flow diagram according to another embodiment of the invention, showing a color removal process and further treatment of water through an evaporator.

A color removal experiment was performed as per the initial step of the embodiment shown in FIG. 2. To 3000 mL of produced water was added 5.8 mL of a 10% sulfuric acid solution to reduce its pH to 4.2. This was followed by addition of 100 ppm color removal chemicals, Wexfloc-9 (30 mL of 1% Wexfloc-9 solution). A mixing retention time of 15 minute was given and then 0.5 ppm of flocculent (1.5 mL of 0.1% AT-7594 solution) was added to the water. The heavy sludge settled within 5 minutes but treated water was decanted after 30 minute for analysis. The results are shown in Table 1.

The pH & conductivity were checked by laboratory instruments. The color was analyzed as per APHA Platinum-Cobalt standard method through a HACH DR/2010 spectrophotometer. The silica was analyzed by silicomolybdate method through a HACH DR/2010 spectrophotometer. TSS was analyzed through filtration and gravimetric method as per APHA total suspended solids method. TOC was analyzed through TOC Analyzer (Model: TOC-L CPH, Shimadzo corporation).

TABLE 1

| | Color Removal Process | | |
| --- | --- | --- | --- |
| Parameters | Raw Produced water | Treated water | Reduction |
| pH | 8.05 | 4.22 | |
| Conductivity, μS/cm | 3130 | 3300 | |
| Color, PtCo unit | 4260 | 360 | 91.55% |
| TOC, ppm | 389.6 | 145 | 62.78% |
| Silica as SiO2, ppm | 240 | 160 | 33.3% |
| TSS, ppm | 140 | 14 | 90% |

It was evident that around 90% of color removal and 60% of organics removal were easily achievable by this process. The process further reduced around 33% of silica from the water.

Example 2

Figure 3:
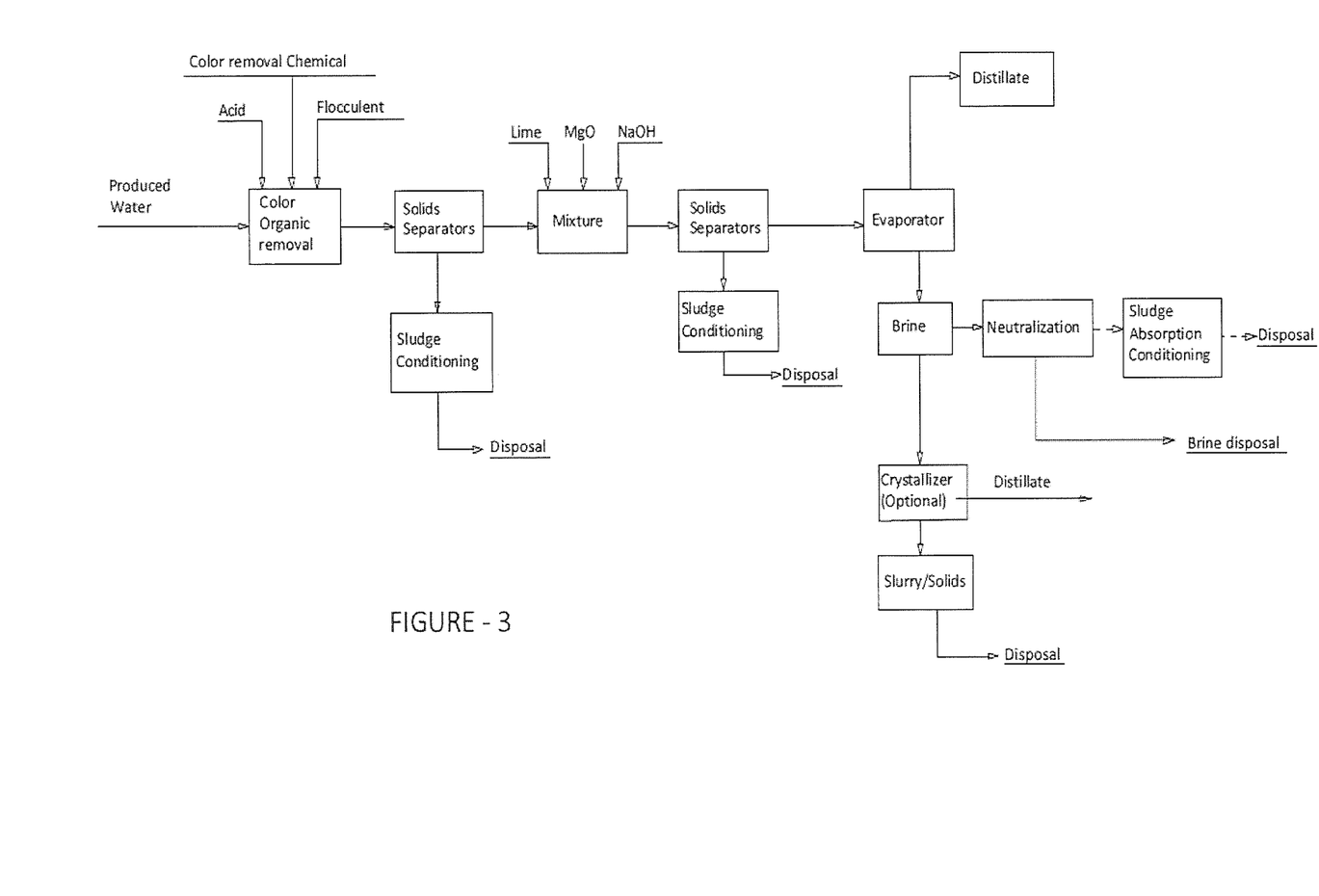
FIG. 3 is a flow diagram according to another embodiment of the invention, showing color and silica removal processes and further treatment of water through an evaporator.

In another experiment produced water was treated as shown in FIG. 3. The produced water was first treated with a color removal process as described in Example 1. In the decanted treated water, magnesium oxide was added with constant agitation. The water was continuously mixed for 15 minutes, and then its pH was increased to 10 by the addition of lime. Finally the pH was further increased to 11 by the addition of sodium hydroxide. Then 2.5 ppm of coagulant AT 7260 was added to the water and mixed for another 2 minutes. The sludge settled within 15 minutes of retention time in a solids separator, and supernatant treated water was decanted. A portion of treated water was analyzed and results are shown in Table 2.

The pH & conductivity were checked by laboratory instruments. The color was analyzed as per APHA Platinum-Cobalt standard method through a HACH DR/2010 spectrophotometer. The silica was analyzed by a silicomolybdate method through a HACH DR/2010 spectrophotometer. TSS was analyzed through filtration & gravimetric method as per the APHA total suspended solids method. Hardness was checked by EDTA Titrimetric method. TOC was analyzed through a TOC Analyzer (Model: TOC-L CPH, Shimadzo corporation).

TABLE 2

| parameters | Raw Produced water | Treated water (after Silica Removal Step) | Removal Efficiency (%) |
|---|---|---|---|
| pH | 8.05 | 11.21 | |
| Conductivity, µS/cm | 3130 | 3670 | |
| Color, PtCo unit | 4260 | 650 | 84.74% |
| TOC, ppm | 389.6 | 122 | 68.68% |
| Silica as SiO2, ppm | 240 | 8 | 96.67% |
| TSS, ppm | 140 | 6 | 95.71% |
| Hardness as CaCO3, ppm | 35 | 20 | |

The results clearly indicated that silica in treated water by this process was below 10 ppm level, around 96.7% reduction was achieved, and color reduction was around 85% and TOC reduction was around 68.7%. It was seen that color values showed a higher reading at alkaline pH.

A further set of tests was conducted on decanted treated water of Example 2. Around 2600 mL of treated water was passed through an evaporation set up and 97% of distillate recovered from the treated water. During evaporation water pH was maintained around 10-10.5 by sodium hydroxide. When the brine volume reduced to 75 mL, a portion of it was analyzed for color and silica content and their results are shown in Table 3. The pH and conductivity were checked by laboratory instruments. The color was analyzed as per the APHA Platinum-Cobalt standard method, and silica was analyzed by a silicomolybdate method through a HACH DR/2010 spectrophotometer.

TABLE 3

| parameters | Raw Produced water | Treated water (after silica removal step) | Brine water |
|---|---|---|---|
| Water volume | 3000 mL | 2600 mL | 75 mL |
| pH | 8.05 | 11.21 | 10.68 |
| Conductivity, µS/cm | 3130 | 3670 | 153800 |
| Color, PtCo unit | 4260 | 650 | 3500 |
| Silica as SiO2, ppm | 240 | 8 | 300 |

During evaporation, no foaming was observed, which otherwise is a common observation in the conventional process. No scaling was observed on evaporator surfaces. The brine was clear, with a significantly lower amount of precipitates. There was no tarry appearance, because color units in the brine were still lower than the color units in the original water.

A further set of tests was conducted on brine water. The brine water (75 mL) was further concentrated up to 19 mL and recovered 75% of water after evaporation and then the concentrated slurry was neutralized to pH 9.0 by acid. No jelly formation occurred on concentrated slurry, which was neutralized with 1.8 mL of 5N hydrochloric acid. The slurry was analyzed, and results are shown in Table 4. The pH and conductivity were checked by laboratory instruments. The color was analyzed as per the APHA Platinum-Cobalt standard method, and silica was analyzed by silicomolybdate method through HACH DR/2010 spectrophotometer.

TABLE 4

| parameters | Concentrated slurry water |
|---|---|
| Slurry Volume | 19 mL |
| Sludge volume in slurry | 25% |
| Water volume in slurry | 75% |
| pH value | 9.0 |
| Conductivity, µS/cm | 352500 |
| Color, PtCo unit | 22750 |
| Silica as SiO2, ppm | 975 |

The absorbance of neutralized slurry was checked on super absorbent. The neutralized slurry, weight around 20 gm, was absorbed on 1.25 gm of superabsorbent. The whole slurry was absorbed on superabsorbent in two hour time period.

Comparative Example 1

Figure 4:
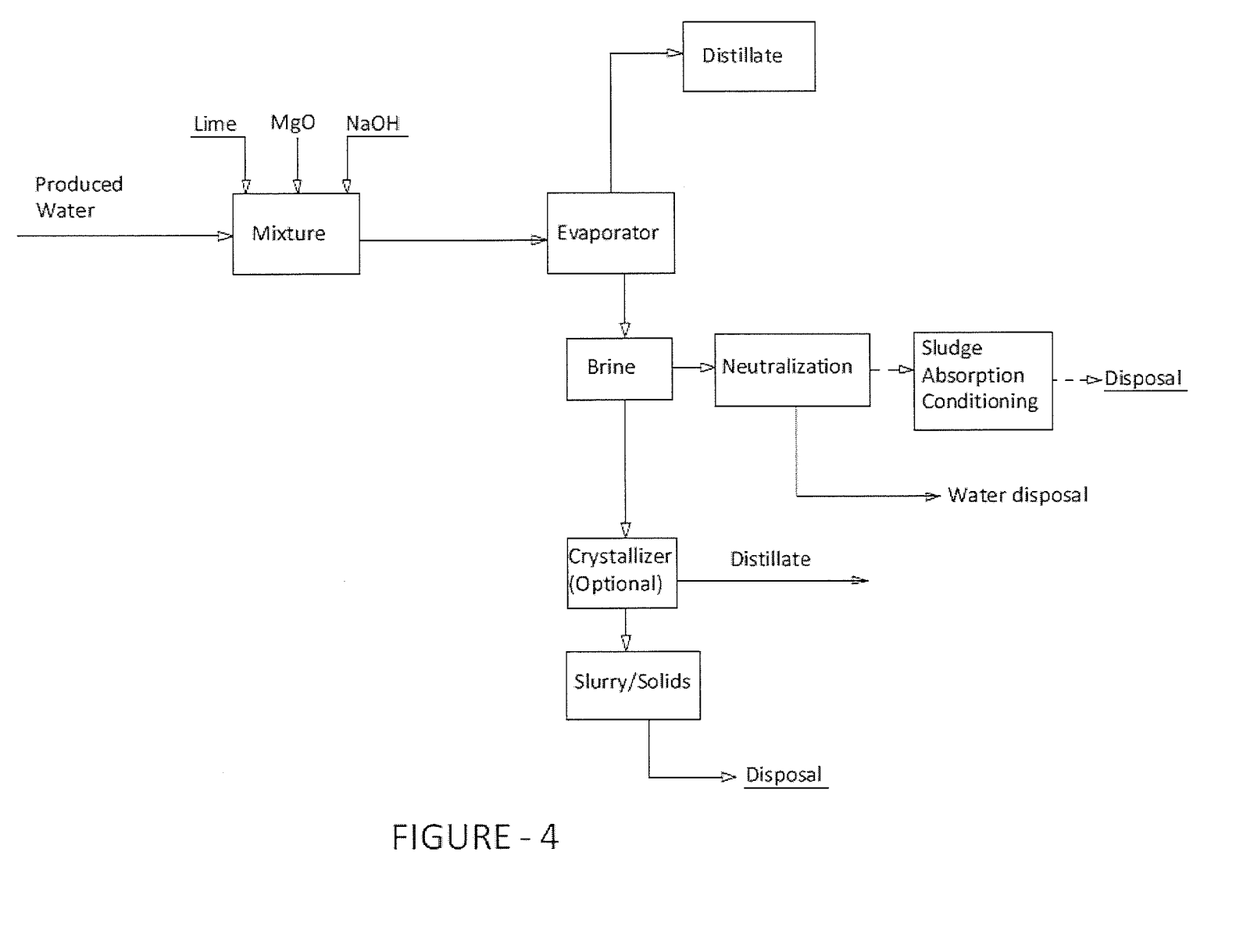
FIG. 4 is a flow diagram of a conventional process for produced water treatment as described in comparative example 1.

In this comparative experiment the 3000 mL of produced water was treated without color removal as shown in FIG. 4. The produced water was first treated by magnesium oxide, lime, sodium hydroxide and coagulant AT-7260. The produced water and dosing chemicals quantity were similar as used in Example 2. It was observed that the sludge settling rate was slow, and it settled in 2 hours of retention time. The supernatant treated water was decanted and a portion of it was analyzed for silica, color, pH and other parameters. The results are shown in Table 5.

The remaining 2700 mL of treated water was passed through evaporator for evaporation. In a similar fashion, 97% of distillate was recovered from the evaporator, keeping the water pH around 10-10.5 in evaporator. The brine water volume was 80 mL. Results are shown in Table 5. The pH and conductivity were checked by laboratory instruments. The color was analyzed as per the APHA Platinum-Cobalt standard method through a HACH DR/2010 spectrophotometer. The silica was analyzed by the silicomolybdate method through a HACH DR/2010 spectrophotometer. TOC was analyzed through a TOC Analyzer (Model: TOC-L CPH, Shimadzo corporation).

TABLE 5

| parameters | Produced water | Treated water (after silica removal step) | Brine water |
|---|---|---|---|
| Water volume | 3000 mL | 2700 mL | 80 mL |
| pH | 8.05 | 11.34 | 10.46 |
| Conductivity, µS/cm | 3130 | 3340 | 154400 |
| Color, PtCo unit | 4260 | 1610 | 52100 |
| Silica as SiO2, ppm | 240 | 31 | 1460 |
| TOC, ppm | 389.6 | 225 | — |

In this comparative experiment, only 87% of silica, 62% of color and only 42% of TOC reduction occurred in silica removal process. During evaporation foaming and scaling were observed in evaporator. The color of brine water of this comparative experiment was almost 15 times greater than the brine color of a process using an embodiment of the invention (Example 2) and silica content was also 5 times larger than Example 2's brine silica.

The results of this comparative example clearly indicated the significance of a color removal process as reported herein.

The brine water was further concentrated and distillate recovery was attempted. Around 72% of water was recovered from brine water during concentration. The brine water became a dark, tar-like slurry. A portion of slurry was analyzed and results are shown in Table 6. The pH and conductivity were checked by laboratory instruments. The color was analyzed as per the APHA Platinum-Cobalt standard method, and silica was analyzed by a silicomolybdate method through a HACH DR/2010 spectrophotometer. The slurry was neutralized by acid.

TABLE 6

| parameters | Concentrated slurry water of comparative example-1 |
|---|---|
| Slurry Volume | 22 mL |
| Sludge volume in slurry | 75% |
| Water volume in slurry | 25% |
| pH value | 9.0 |
| Conductivity, µS/cm | 313000 |
| Color, PtCo unit | 115000 |
| Silica as $SiO_2$, ppm | 1890 |

The following disadvantages were observed during evaporation of treated water and neutralization of concentrated slurry in the Comparative Example 1 experiment.

Foaming and scaling on evaporator during evaporation due to excess color and silica.

More acid consumption as compare to the inventive process.

Foaming and jelly formation during neutralization due to excess silica & other inorganic chemicals.

Dark, tar-like appearance of slurry.

Less water recovery as compare to the inventive process.

Comparative Example 2

Figure 5:
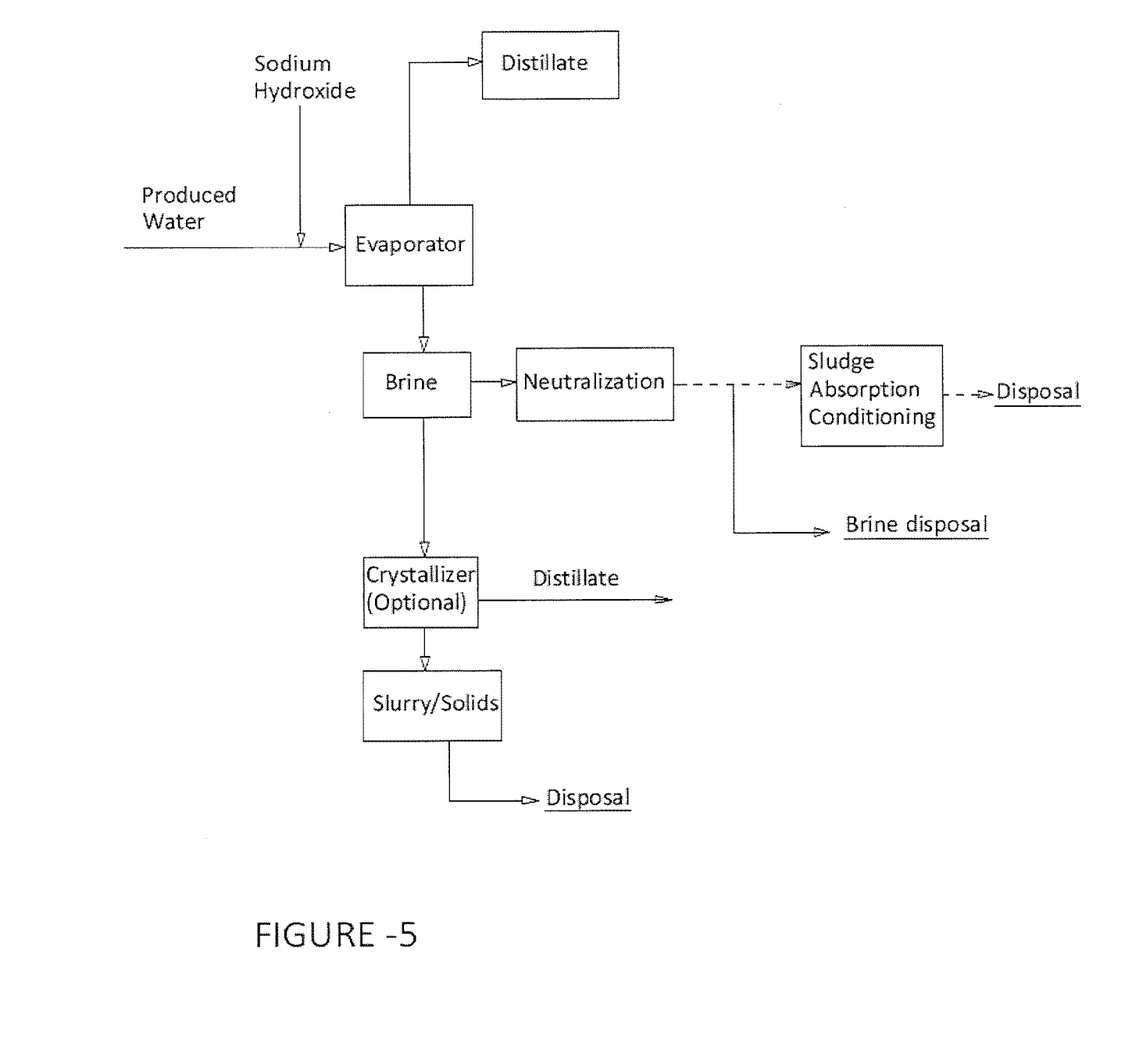
FIG. 5 shows flow diagram of conventional process of produced water treatment as described in the comparative example 2.

In this comparative experiment, 2900 mL of produced water was treated as in a conventional process like that shown in FIG. 5. The color as well as silica removal process was not performed in this experiment. The produced water was directly processed for evaporation. The pH of the produced water was adjusted to 10-10.5 by sodium hydroxide and then the produced water passed through an evaporator. Around 97% of distillate was recovered from the evaporator. Significant foaming and heavy scaling were observed during evaporation. A portion of brine water was analyzed, and results are shown in Table 7. The pH and conductivity were checked by laboratory instruments. The color was analyzed as per the APHA Platinum-Cobalt standard method, and silica was analyzed by a silicomolybdate method through an HACH DR/2010 spectrophotometer. TOC was analyzed through a TOC Analyzer (Model: TOC-L CPH, Shimadzo corporation).

TABLE 7

| parameters | Produced water | Brine water |
|---|---|---|
| Water volume | 2900 mL | 85 mL |
| pH | 8.05 | 10.30 |
| Conductivity, µS/cm | 3130 | 141000 |
| Color, PtCo unit | 4260 | 118000 |
| Silica as $SiO_2$, ppm | 240 | 5120 |

In a further set of tests, an attempt was made to concentrate the brine water further, but only 59% of distillate recovery would be possible from brine water. It became a dark colored tar-like slurry as its color were observed as 267000 PtCo unit. This slurry contained a significantly lower amount of water and was very difficult to neutralize by acid. A portion of the water was analyzed, and results are shown in Table 8. The pH and conductivity were checked by laboratory instruments. The color was analyzed as per the APHA Platinum-Cobalt standard method through a HACH DR/2010 spectrophotometer.

TABLE 8

| parameters | Concentrated slurry water of comparative example-1 |
|---|---|
| Slurry Volume | 35 mL |
| Sludge volume in slurry | 90% |
| Water volume in slurry | 10% |
| pH value | 9.0 |
| Conductivity, µS/cm | 298000 |
| Color, PtCo unit | 267000 |

In this Comparative Example 2, the following disadvantages were observed during treatment:

Significant foaming and severe scaling on evaporator during evaporation due to excess of color and silica in brine water.

More acid consumption for neutralization of slurry. Foaming and jelly formation during neutralization due to excess color and silica contents.

Dark, tar-like appearance of slurry. Difficult to remove the scaling and tar-like solids from vessel.

The advantages of various embodiments of the invention were well-illustrated by a tabular comparison of the chemical consumption necessary to treat 3000 mL of produced water in the experiments discussed above. These numbers clearly showed the reduction in chemical consumption in the pretreatment process and also acid consumption before the final disposal process.

TABLE 9

| Chemicals Description | Example-1 Experiment | Example-2 Experiment | Comparative Example-1 Experiment | Comparative Example-2 Experiment |
|---|---|---|---|---|
| Sulfuric Acid (10% Conc.) for color removal process | 5.8 mL | 5.8 mL | N/A | N/A |
| Magnesium Oxide (solid, 97% pure) for silica removal process | N/A | 1.5 gm | 1.5 gm | N/A |
| Lime (solid, 90% pure) for silica removal process | N/A | 0.2 gm | 0.341 gm | N/A |
| Sodium Hydroxide (10% Conc.) for Silica removal & | about 9 mL | 8.3 mL | 11.5 mL | 12.9 mL |

TABLE 9-continued

| Chemicals Description | Example-1 Experiment | Example-2 Experiment | Comparative Example-1 Experiment | Comparative Example-2 Experiment |
|---|---|---|---|---|
| evaporation process HCl (5N Conc.) for Brine Neutralization process up to 9.0 pH | N/A | 1.8 mL | 2.5 mL | 3.5 mL |
| Color Removal Polymer Wexfloc-9 (1% Conc.) | 30 mL | 30 mL | N/A | N/A |
| Polymer AT-7594 (0.1% conc.) | 1.5 mL | 8.5 mL | 7.5 mL | N/A |

N/A—Not applicable

We claim:

1. A process for purification of water, comprising:
collecting produced water including an oil/water mixture from an oil well;
separating and recovering oil from the produced water;
decreasing the pH of the produced water by addition of acid;
removing color, organics, and silica from the produced water;
adding a flocculent, including, optionally, a coagulant and a polyelectrolyte, to the produced water to aggregate solids in the produced water;
removing solids from the produced water, thereby producing a first sludge;
conditioning and disposing of the first sludge;
sending the produced water to an evaporator, producing a distillate stream and a brine stream;
sending the distillate stream to a boiler for evaporation into steam; and
sending a portion of the brine stream to a crystallizer for removal of additional distillate and production of a slurry to achieve zero liquid discharge without formation of a tarry mass.

2. The process of claim 1, wherein the pH of the produced water is increased to between 9.5-10 after removal of color and organics and before sending the produced water to the evaporator.

3. The process of claim 1, wherein between 60-80% of organics, 80-95% of color, and more than 25-50% of silica are removed from the produced water in the color removing step.

4. The process of claim 1, wherein said brine stream is converted to a solid through absorption with super absorbent polymer.

5. The process of claim 1, wherein said brine stream is neutralized to a pH between 8.5 and 9 with the addition of acid and without formation of a silica jelly.

6. The process of claim 1, further comprising, after the step of conditioning and disposing of the first sludge, the steps of:
mixing the produced water with at least one of magnesium oxide and magnesium hydroxide; and
mixing the produced water with one or more of lime, calcium oxide, and sodium hydroxide, thereby precipitating silica from the produced water.

7. The process of claim 1, further comprising, after precipitating silica from the produced water, removing the precipitated silica as a second sludge; and
conditioning and disposing of the second sludge.

8. The process of claim 7, further comprising deaerating the produced water after at least one of separation of the first sludge and separation of the second sludge.

9. The process of claim 1, wherein said acid addition lowers the pH of the produced water to between 3 to 5.

10. The process of claim 9, wherein said acid addition lowers the pH of the produced water to between 4 to 4.5.

11. The process of claim 6, wherein said mixing the produced water with one or more of lime, magnesium hydroxide, calcium oxide, and sodium hydroxide adjusts the pH to between 10-11.5.

12. A process for preconditioning water prior to treatment in an evaporation or reverse osmosis treatment, comprising:
providing a water stream including color;
removing color, organics, and silica from the water stream by the steps of:
adding an acid;
adding a color removal chemical; and
adding a flocculent to aggregate solids in the water stream;
removing the solids from the water stream;
increasing the pH of the water stream; and
sending the produced water to at least one of a evaporator and a reverse osmosis unit,
wherein a portion of the water leaving the at least one of the evaporator and the reverse osmosis unit is sent to a crystallizer for production of a slurry to achieve zero liquid discharge without formation of a tarry mass.

13. The process of claim 12, wherein said produced water is sent to an evaporator.

14. The process of claim 12, further comprising, prior to sending the water to a reverse osmosis unit, softening the water.

15. A process for preconditioning water prior to treatment in a reverse osmosis unit or evaporator, comprising:
providing water comprising silica, color, and organics;
decreasing the pH of the water by addition of acid;
removing color, organics, and silica from the water by addition of color-removal chemicals;
adding a flocculent to the water to aggregate solids in the water;
removing aggregated solids from the produced water, thereby producing a first sludge;
conditioning and disposing of the first sludge;
mixing the water with one or more of lime, magnesium oxide, calcium oxide, and sodium hydroxide, thereby precipitating additional solids;
removing the additional solids as a second sludge conditioning and disposing of the second sludge; and
sending the water to an evaporator or reverse osmosis unit,
wherein a portion of the water leaving the evaporator or the reverse osmosis unit is sent to a crystallizer for production of a slurry to achieve zero liquid discharge without formation of a tarry mass.

16. The process of claim 15, wherein the water is sent to an evaporator.

17. The process of claim 15, further comprising, prior to sending the water to a reverse osmosis unit, softening the water.

18. A process for purification of water, comprising:
collecting produced water including an oil/water mixture from an oil well;
separating and recovering oil from the produced water;
decreasing the pH of the produced water by addition of acid;

removing color, organics, and silica from the produced water;

adding a flocculent, including, optionally, a coagulant and a polyelectrolyte, to the produced water to aggregate solids in the produced water;

removing solids from the produced water, thereby producing a first sludge;

conditioning and disposing of the first sludge;

mixing the produced water with one or more of lime, magnesium oxide, magnesium hydroxide, calcium oxide, and sodium hydroxide, thereby precipitating silica from the produced water;

removing precipitated silica as a second sludge;

conditioning and disposing of the second sludge;

sending the produced water to an evaporator, producing a distillate stream and a brine stream;

sending the distillate stream to a boiler for evaporation into steam; and sending a portion of the brine stream to a crystallizer for removal of additional distillate and production of a slurry to achieve zero liquid discharge without tar formation.

19. A two-stage process for silica reduction from water, comprising:

from a water stream comprising silica, water, and organics, coprecipitating at least some silica with color and organics;

precipitating additional silica from the water stream by addition of at least one silica-precipitating compound selected from the group consisting of lime, magnesium oxide, magnesium hydroxide, calcium oxide, and sodium hydroxide upstream of an evaporator or reverse osmosis system, wherein a portion of the water leaving the evaporator or the reverse osmosis system is sent to a crystallizer for production of a slurry to achieve zero liquid discharge without formation of a tarry mass.

20. The process of claim 19, wherein coprecipitation of silica with color and organics reduces the amount of silica-precipitating and overall process chemicals necessary to reduce silica to a desired level.

* * * * *